United States Patent
Devendran et al.

(10) Patent No.: US 8,464,023 B2
(45) Date of Patent: Jun. 11, 2013

(54) APPLICATION RUN-TIME MEMORY OPTIMIZER

(75) Inventors: Saravanan Devendran, Bangalore (IN); Kiran Grover, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 12/869,927

(22) Filed: Aug. 27, 2010

(65) Prior Publication Data
US 2012/0054466 A1 Mar. 1, 2012

(51) Int. Cl.
*G06F 12/10* (2006.01)

(52) U.S. Cl.
USPC ............... 711/206; 711/154; 711/E12.061

(58) Field of Classification Search
USPC .................. 711/154, 206, E12.061
See application file for complete search history.

(56) References Cited

U.S. PATENT DOCUMENTS

| | | | |
|---|---|---|---|
| 5,765,201 A | 6/1998 | Manges et al. | |
| 6,549,930 B1* | 4/2003 | Chrysos et al. | 718/104 |
| 2003/0115476 A1* | 6/2003 | McKee | 713/193 |
| 2004/0236924 A1 | 11/2004 | Johnson et al. | |
| 2006/0123217 A1* | 6/2006 | Burdick et al. | 711/173 |
| 2006/0288187 A1 | 12/2006 | Burugula et al. | |
| 2006/0294334 A1* | 12/2006 | Jann et al. | 711/170 |
| 2007/0180215 A1* | 8/2007 | Cascaval et al. | 711/202 |
| 2007/0283125 A1* | 12/2007 | Manczak et al. | 711/207 |
| 2007/0299810 A1* | 12/2007 | Riedel et al. | 707/2 |
| 2008/0104362 A1 | 5/2008 | Buros et al. | |
| 2008/0177976 A1* | 7/2008 | Branda et al. | 711/173 |
| 2008/0288718 A1 | 11/2008 | Hepkin et al. | |
| 2011/0055838 A1* | 3/2011 | Moyes | 718/102 |

OTHER PUBLICATIONS

"Practical, transparent operating system support for superpages", 2002, 5th Symposium on Operating Systems Design and Implementation, pp. 1-29, OSDI'02 Paper pp. 89-104 http://www.usenix.org/publications/library/proceedings/osdi02/tech/full$_{13}$ papers/navarro/navarro_html/index.html.
Gopinath et al., "Program Analysis for Page Size Selection", 1996 IEEE, pp. 189-194.

* cited by examiner

*Primary Examiner* — Hal Schnee
(74) *Attorney, Agent, or Firm* — Yee & Associates, P.C.; Tom Tyson

(57) ABSTRACT

A computer implemented method optimizes memory page sizes during runtime. A process is identified from a policy file. The policy file contains at least one policy based threshold. A resource usage profiler monitors the process during runtime. The resource usage profiler determines whether the process exceeds the set of stated desired policies from the at least one policy based threshold. If the process exceeds the set of stated desired policies from the set of policy based thresholds, a performance projection for the process is executed to determine whether the process would experience a performance benefit from a different page size. Responsive to determining that the process would experience the performance benefit from the different page size, the page size for the process is changed.

18 Claims, 8 Drawing Sheets

FIG. 8a — REFERENCE PATTERN 800: 801, 802, 803, 804, 805, 806, 807, 808, 809, 810, 811, 812, 813, 814, 815, 816

FIG. 8b — REFERENCE PATTERN 820: 821, 822, 823, 824, 825, 826, 827, 828, 829, 830, 831, 832, 833, 834, 835, 836

FIG. 8c — REFERENCE PATTERN 840: 841, 842, 843, 844, 845, 846, 847, 848, 849, 850, 851, 852, 853, 854, 855, 856

APPLICATION RUN-TIME MEMORY OPTIMIZER

BACKGROUND

1. Field

The disclosure relates generally to computer implemented methods, computer program products, and data processing systems. More specifically, to computer implemented methods, computer program products, and data processing systems for optimizing page sizes of applications during runtime.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system, or each different operating system, directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

Hypervisors such as those on IBM's mainframe products, as well as EMC™'s vmware® have provided a means of virtualizing memory to partitions running on the physical hardware. This technique allows memory to move, based on demand from partition to partition on the virtualized system. The physical memory is managed by the hypervisor, and that management is mostly transparent to the partitions running on top of the hypervisor. This virtualized partition memory is sometimes referred to as virtual real memory (VRM).

New hardware and operating systems running on that hardware are able to support much bigger page sizes than what it existed of in the past. The larger page sizes directly reduces the number of entries in the Hardware Page Frame Table & reduces the latency for page look-ups upon a cache miss.

To use larger page sizes, applications need to be altered or the Virtual Memory Subsystem of the Operating System need to automatically promote the page size to a larger page size. However, page promotion by the Operating System, has many drawbacks. For one, the Operating System cannot promote page sizes until it finds a set of contiguous pages that can be combined together to a larger page size. Additionally, the Operating System does not understand the application's demand on resources before doing the promotion. Hence, this may not result in benefits to the application or the workload all the time. Finally, the application or administrators do not have much control.

SUMMARY

According to one embodiment of the present invention, a computer implemented method, a data processing system, and a computer program product are described for optimizing memory page sizes during runtime. A process is identified from a policy file. The policy file contains at least one policy based threshold. A resource usage profiler monitors the process during runtime. The resource usage profiler determines whether the process exceeds the set of stated desired policies from the list of policy based thresholds. If the process exceeds the set of stated desired policies from the list of policy based thresholds, a performance projection for the process is executed to determine whether the process would experience a performance benefit from a different page size. Responsive to determining that the process would experience the performance benefit from the different page size, the page size for the process is changed.

BRIEF DESCRIPTION OF THE SEVERAL VIEWS OF THE DRAWINGS

FIG. 6, which is divided into

FIG. 8, which is divided into FIG. 8a, FIG. 8b and FIG. 8c, is a plurality of memory reference patterns to identify promotable pages from candidate pages according to an illustrative embodiment;

DETAILED DESCRIPTION

Figure 1:
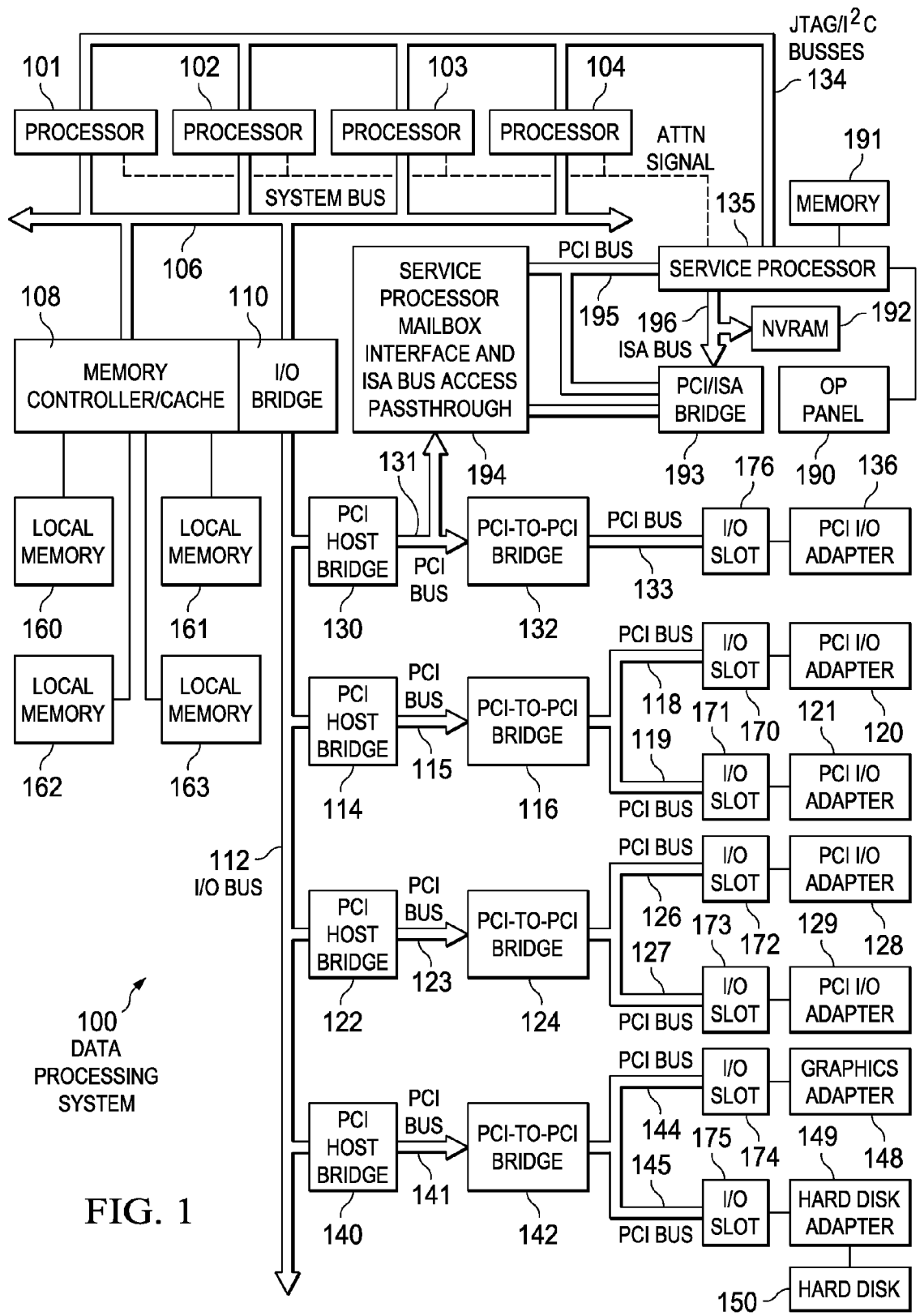
FIG. 1 is a block diagram of a data processing system in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux® or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to, or in place of, the hardware depicted. The depicted example is not meant to imply architectural limitations with respect to illustrative embodiments.

Figure 2:
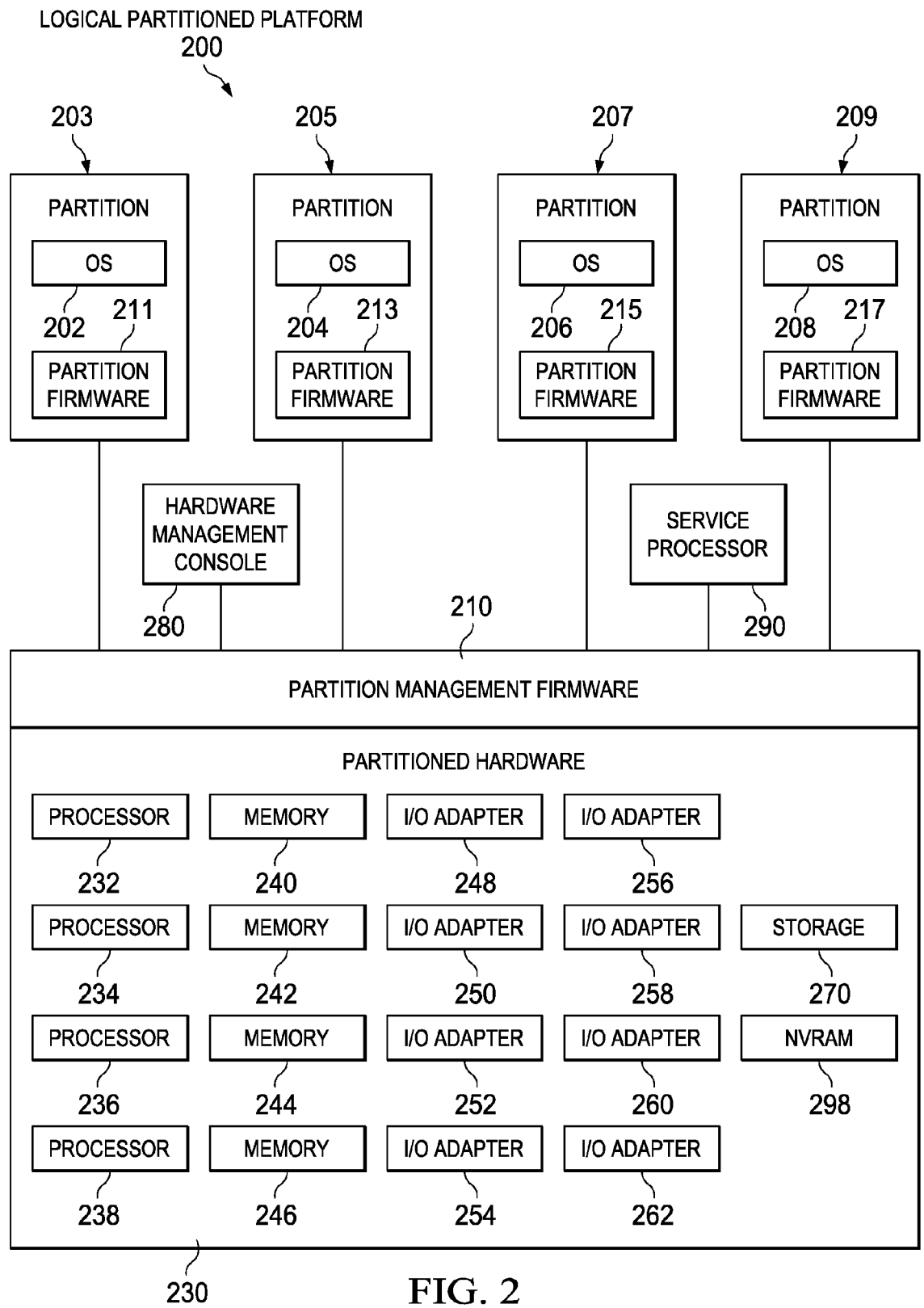
FIG. 2 is a block diagram of an exemplary logical partitioned platform in accordance with an illustrative embodiment.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by partition management firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, storage unit 270, and NVRAM storage 298. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent operating systems 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The illustrative embodiments provided herein particularly aim to give a methodology to promote page sizes of applications based on an application's behavior and also on its demand on resources. The embodiments aim to provide ways for administrators to configure threshold policies for page promotion. Page promotions remain transparent to applications. The page promotions are performed based on workloads demands. Administrators flexibly control the page promotions by defining page promotion thresholds.

The illustrative embodiments provide an application runtime memory optimizer to dynamically alter the page size used by the application. The run-time memory optimizer promotes pages from smaller to larger page sizes and demotes pages from larger to smaller page sizes. The run-time memory optimizer can be constantly active and can continuously monitor and optimize applications based on the applications demand on the central processing unit and the available memory resources. The promotion and demotion of pages within the running application to different page sizes is done on the basis of central processing unit resources, memory access patterns, and page translation misses.

Figure 3:
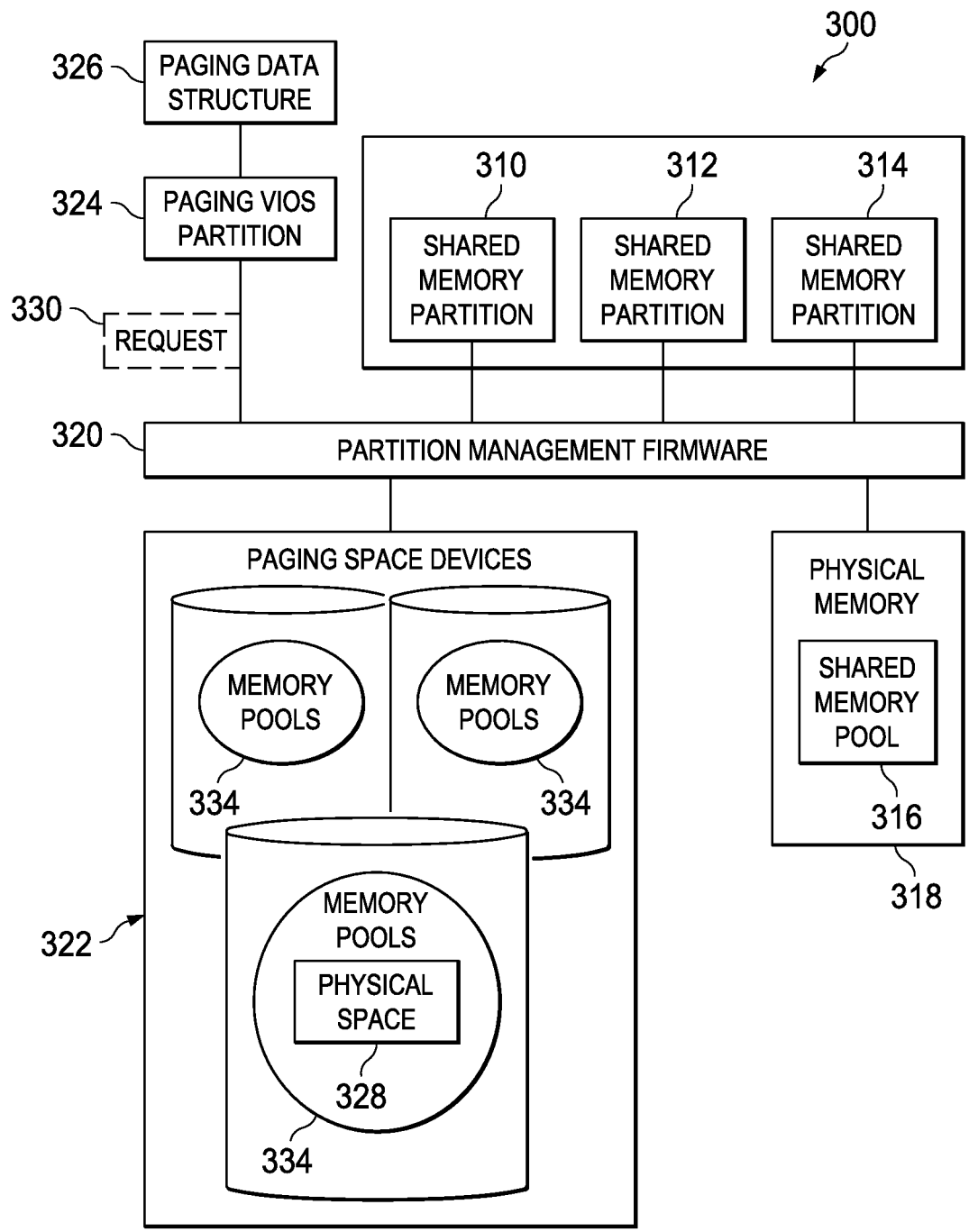
FIG. 3 is a logical partitioned platform having a physically overcommitted shared memory configuration in accordance with an illustrative embodiment.

Referring now to FIG. 3, a logical partitioned platform having a physically overcommitted shared memory configuration is shown according to an illustrative embodiment. Logical partitioned platform 300 is a logical partitioned platform, such as logical partitioned platform 200 of FIG. 2.

Shared memory partitions 310, 312, and 314 are partitions, such as partitions 203, 205, 207, and 209 of FIG. 2, of memory allocated to shared memory pool 316 from physical memory 318. Shared memory pool 316 is a defined collection of physical memory blocks that are managed as a single memory pool by partition management firmware 320. Shared memory within shared memory pool 316 is a portion of physical memory 318 that is assigned to shared memory pool 316 and shared among shared memory partitions 310, 312, and 314. Partition management firmware 320 is partition management firmware, such as partition management firmware 210 of FIG. 2.

Partition management firmware 320 does not assign a dedicated amount of physical memory 318 to each of shared memory partitions 310, 312, and 314. Instead, partition management firmware 320 constantly provides memory as needed from shared memory pool 316 to each of shared memory partitions 310, 312, and 314. Partition management firmware 320 provides portions of the shared memory pool that are not currently being used by shared memory partitions to other shared memory partitions that need to use the memory. Each of shared memory partitions 310, 312, and 314 share that portion of physical memory 318 that is assigned to shared memory pool 316 with others of shared memory partitions 310, 312, and 314.

Partition management firmware 320 determines the amount of memory allocated from shared memory pool 316 to each of shared memory partitions 310, 312, and 314 based on the workload and memory configuration of each of shared memory partitions 310, 312, and 314. When allocating physical memory 318 to shared memory partitions 310, 312, and 314, partition management firmware 320 ensures that each of shared memory partitions 310, 312, and 314 can access only a portion of shared memory pool 316 allocated to the shared memory partition at any given time. Shared memory partitions 310, 312, and 314 cannot access the physical memory of shared memory pool 316 allocated to another of shared memory partitions 310, 312, and 314.

When one of shared memory partitions 310, 312, and 314 needs more memory than a current amount of unused memory in the shared memory pool 316, partition management firmware 320 stores a portion of the memory that belongs to the shared memory partition in paging space devices 322. Paging space devices 322 is nonvolatile storage used to hold portions of a shared memory partition's logical memory that do not reside in shared memory pool 316. In one illustrative embodiment, paging space devices 322 is a hard disk, such as hard disk 150 of FIG. 1.

Access to paging space devices 322 is provided by paging VIOS partition 324. Paging VIOS partition 324 is a logical partition, such as one of partitions 203, 205, 207, and 209 of FIG. 2 that provides access to paging space devices 322 required for shared memory partitions 310, 312, and 314 in an overcommitted memory configuration. When the operating system in one of shared memory partitions 310, 312, and 314, such as operating systems 202, 204, 206, or 208 of FIG. 2, attempts to access data that is located in paging space devices 322, partition management firmware 320 directs paging VIOS partition 324 to retrieve the data from paging space devices 322 and write to shared memory pool 316 so that the operating system can access the data.

When an operating system or other program within one of shared memory partitions 310-314 first begins executing, the operating system copies a small portion of the process address space from a program file stored on a disk, such as hard disk 150 of FIG. 1, into shared memory pool 316. This portion typically includes the first page of instructions and possibly a small amount of data that is needed at start-up. As more instructions or data are needed, the operating system brings in pages from the process' address on demand.

When an operating system within one of shared memory partitions 310-314 needs access to a specific resource, instruction, or data, that particular one of shared memory partitions 310-314 must establish a virtual memory page to real memory mapping for the resource. The operating system of the particular one of shared memory partitions 310-314 makes a request to partition management firmware 320 to access the resource. Partition management firmware 320 checks paging data structure 326 to determine whether the physical resource has been mapped as a virtual resource. Paging data structure 326 is a data structure containing mappings of virtual memory space to physical space 328 within one of memory pools 334 of one of paging space devices 322. Paging data structure 326 can be, for example, but not limited to, a data structure such as an array, a list, a binary tree, a B-tree, a heap, a hash, or a graph.

Paging data structure 326 contains page entries. If the physical resource has been mapped, partition management firmware 320 grants the particular one of shared memory partitions 310-314 access to the virtual resource. If the physical resource has not been mapped, partition management firmware 320 creates a new entry in paging data structure 326. Physical space at paging space devices 322 can be allocated either at the time the entry is made or at a subsequent time when request 330 is received for paging a page out from shared memory pool 316.

The illustration of logical partitioned platform 300 in FIG. 3 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
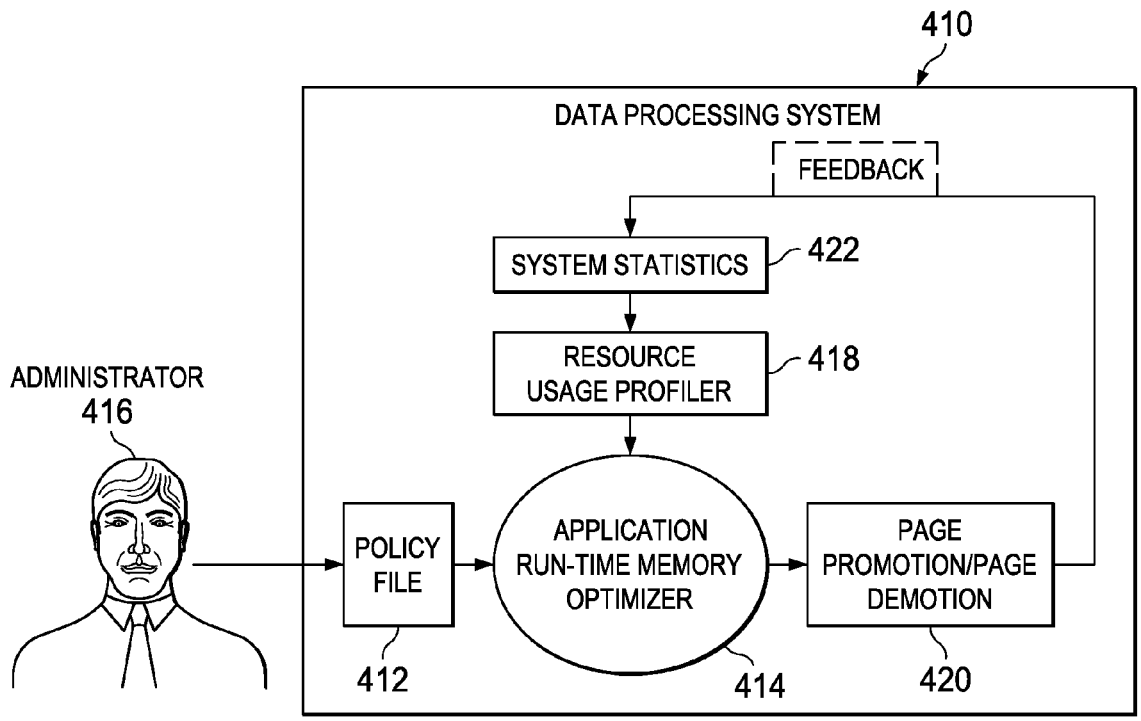
FIG. 4 is a data flow shown for promoting or demoting pages to different page sizes according to an illustrative embodiment.

Referring now to FIG. 4, a data flow is shown for promoting or demoting pages to different page sizes according to an illustrative embodiment. Data processing system 410 can be a logical partitioned platform, such as logical partitioned platform 200 of FIG. 2.

Data processing system 410 includes policy file 412. Policy file 412 is a data structure that contains criteria or rule bases that allow application run-time memory optimizer 414 to determine whether a memory page should be promoted to a larger page size or demoted to a smaller page size. Policy file 412 allows administrator 416 to have customizable control over the page promotion/demotion process, such that the policy set can be defined and altered based on the applications' workload demands. Policy file 412 allows administrator 416 to set various threshold values for page promotion/demotion. Policy file 412 allows administrator 416 to selectively monitor certain ones of the stream of running processes. Policy file 412 allows administrator 416 to control the frequency at which page promotion/demotion should be triggered. Policy file 412 is used to effectuate stated desired policies through the use of various threshold values. Policy file 412 allows administrator 416 to control the range of page sizes that would be used for page promotion/demotion.

Application run-time memory optimizer 414 is a software component executing on data processing system 410. Application run-time memory optimizer 414 monitors resource usage of applications running on data processing system 410. Application run-time memory optimizer 414 receives system statistics from resource usage profiler 418 to determine pages for promotion and demotion. Application run-time memory optimizer 414 then recommends pages identified for promotion or demotion to page promotion/page demotion 420.

Resource usage profiler 418 is a software component executing on data processing system 410. Resource usage profiler 418 gathers system statistics 422 for use by application run-time memory optimizer 414 in determining candidate pages for page promotion/demotion by page promotion/page demotion 420. Resource usage profiler 418 can gather system statistics 422 such as, but not limited to, central processing unit resource usage, memory access patterns, page translation misses from the translation lookaside buffer, and cache misses from data and instruction caches.

Resource usage profiler 418 utilizes an algorithm for gathering system statistics 422. Resource usage profiler 418 collects processor utilization information and memory resource utilization information at the process-level. That is, resource usage profiler 418 collects segregated information for each monitored process executing on data processing system 410.

Resource usage profiler 418 filters the processes based on threshold values defined by administrator 416 in policy file 412. Processes whose processor utilization information and memory resource utilization information exceed the threshold values are identified as candidates for page promotion/page demotion.

Resource usage profiler 418 performs detailed memory access profiling on the filtered processes to gather information. Resource usage profiler 418 gathers system statistics 422 such as, but not limited to, information on the physical and virtual addresses of accessed memory pages, information on the number of translation misses within the translation lookaside buffer, information on the sizes of the pages being utilized by the monitored processes, information on the sequentiality of the pages, information on the segmentation of the memory pages, and other memory access related information.

Page promotion/page demotion 420 is a software component executing on data processing system 410. In one illustrative embodiment, page promotion/page demotion 420 can be implemented as part of application run-time memory optimizer 414. Page promotion/page demotion 420 receives the list of page sizes defined by administrator 416 in policy file 412 for page promotion/page demotion, makes system calls to promote pages from smaller page sizes to larger page sizes, and demote pages from larger page sizes to smaller page sizes.

Figure 5:
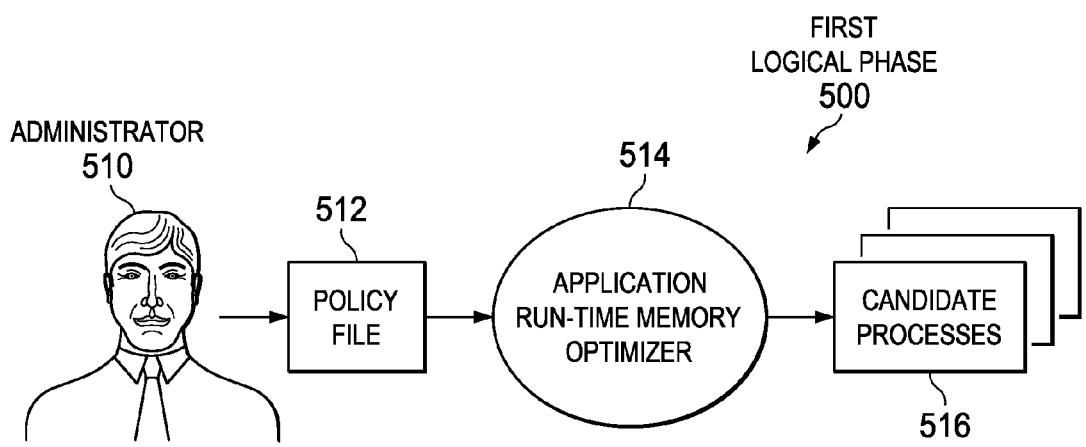
FIG. 5 is a data flow for a first logical phase for promoting or demoting pages to different page sizes according to an illustrative embodiment.

Referring now to FIG. 5, a data flow for a first logical phase for promoting or demoting pages to different page sizes is shown according to an illustrative embodiment. First logical phase 500 is a subprocess of the dataflow of FIG. 4. In first logical phase 500, an application run-time memory optimizer, such as application run-time memory optimizer 414 of FIG. 4, acts as to monitor processor consumption and memory usage of the monitored applications. Monitored applications are applications executing on the data processing system that are specified within a policy file, such as policy file 412 of FIG. 4, for being monitored.

Administrator 510 is administrator 416 of FIG. 4. Administrator 510 accesses and edits policy file 512. Administrator 510 is provided control over the page promotion/page demotion by accessing policy file 512. Administrator 510 can set various threshold values within policy file 512 to influence page promotion/page demotion.

Policy file 512 is policy file 412 of FIG. 4. Policy file 512 contains the policy based criteria or rule base required to determine whether specific pages are candidates for page promotion or page demotion. Policy file 512 allows administrator 510 to have customizable control over the page promotion/page demotion process, such that the policy set can be defined and altered based on the applications' workload demands. Policy file 512 allows administrator 510 to set various threshold values for page promotion/page demotion. Policy file 512 allows administrator 510 to selectively monitor certain ones of the stream of running processes. Policy file 512 allows administrator 510 to control the frequency at which page promotion/page demotion should be triggered. Policy file 512 allows administrator 510 to control the range of page sizes that would be used for page promotion/page demotion.

Application run-time memory optimizer 514 is application run-time memory optimizer 414 of FIG. 4. Application run-time memory optimizer 514 monitors processes identified by policy file 512 over a set time period to determine system statistics, such as system statistics 422 of FIG. 4. Application run-time memory optimizer 514 monitors processes identified by policy file 512 for various parameters like processor consumption and memory usage. Application run-time memory optimizer 514 identifies processes with consistently high resource usage as candidates for page promotion. Application run-time memory optimizer 514 identifies processes with consistently low resource usage as candidates for page demotion. Consistently high and consistently low are relative terms that can be controlled by administrator 510 through policy file 512. Thus, policy file 512 defines what is "consistently high" and "consistently low."

Application run-time memory optimizer 514 identifies processes with consistently high resource usage as candidates for page promotion. Application run-time memory optimizer 514 identifies processes with consistently low resource usage as candidates for page demotion. Application run-time memory optimizer 514 identifies these processes as candidate processes 516.

Figure 6A:
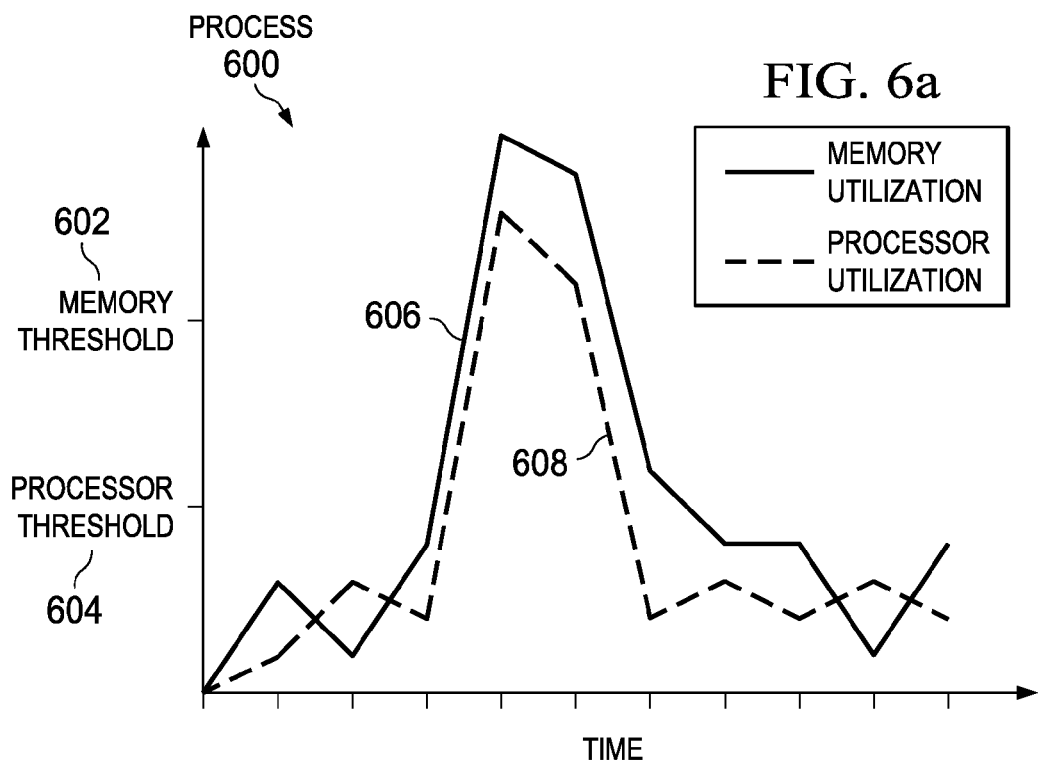
FIG. 6a, FIG. 6b and FIG. 6c, is a series of time-line graphs plotting resource usage over time to identify candidate pages for promotion or demotion according to an illustrative embodiment.
Figure 6B:
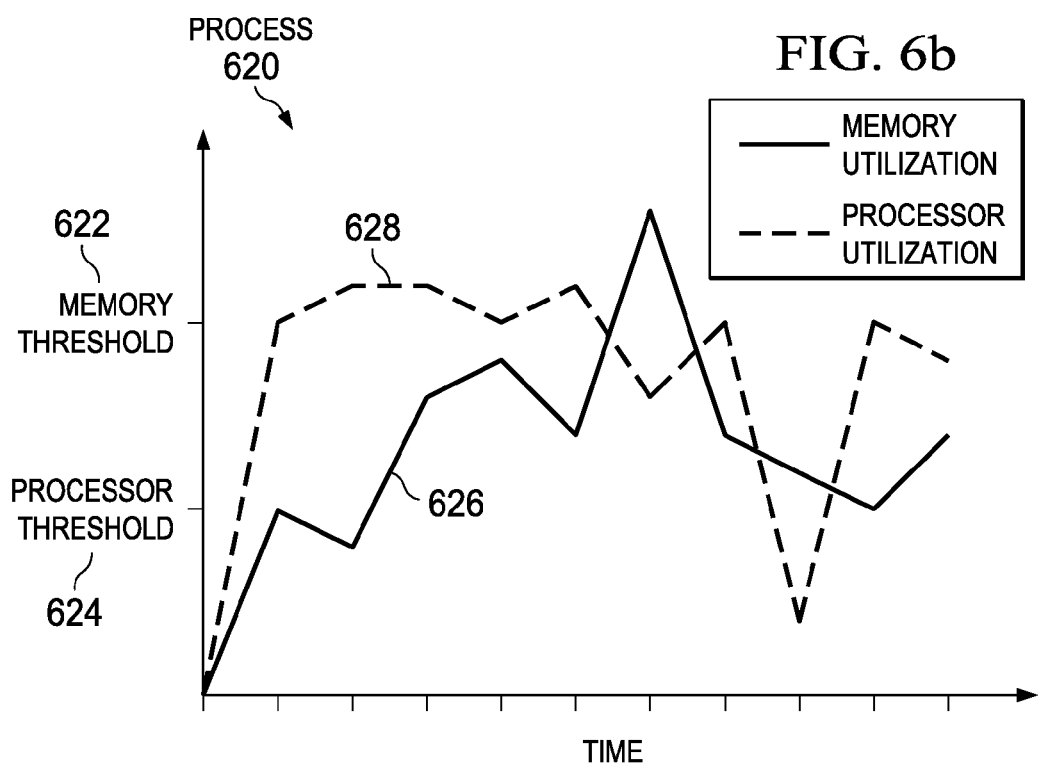
Figure 6C:
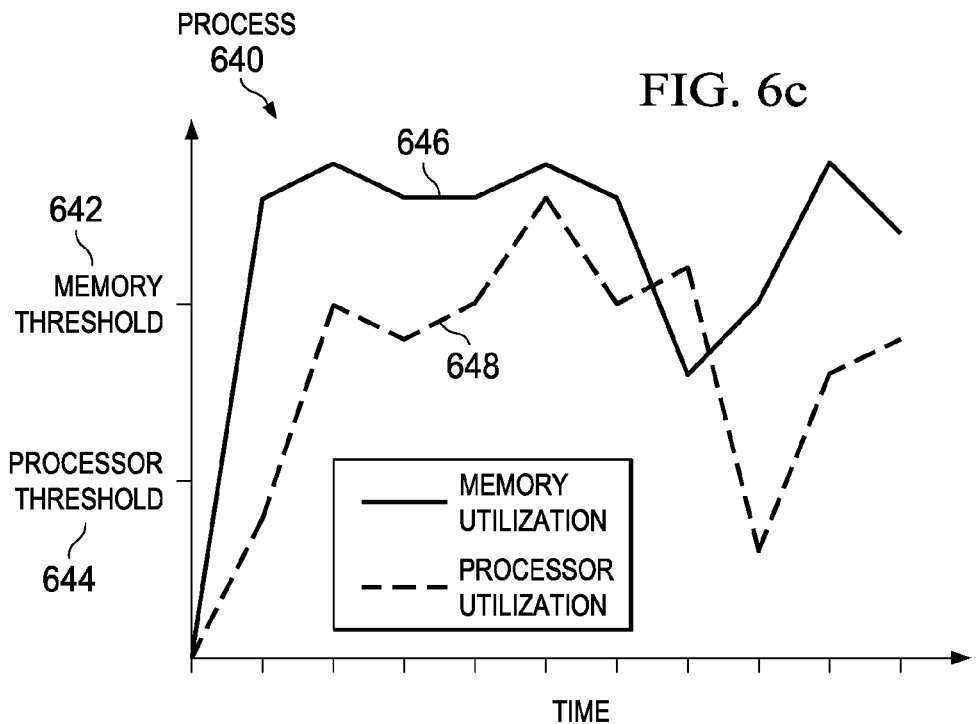

Referring now to FIGS. 6a, 6b, and 6c, a series of time-line graphs plotting resource usage over time to identify candidate pages for promotion or demotion is shown according to an illustrative embodiment. Process 600 of FIG. 6a, process 620 of FIG. 6b, and process 640 of FIG. 6c are software processes executing on a data processing system, such as data processing system 410 of FIG. 4. Processes 600, 620, and 640 are processes identified within a policy file, such as policy file 512 of FIG. 5, for monitoring.

Referring now specifically to FIG. 6a, a time-line graph plotting resource usage over time of process 600 is shown according to an illustrative embodiment. Memory threshold 602 and processor threshold 604 are thresholds identified within a policy file, such as policy file 512 of FIG. 5. Memory threshold 602 and processor threshold 604 identify a minimum utilization by a process that is necessary for the process to be considered for page promotion. Memory utilization 606 is a graphical representation of memory utilization over a certain time period. Processor utilization 608 is a graphical representation of processor utilization over a certain time period.

For process 600, there are few spikes where memory utilization 606 exceeds memory threshold 602 and where processor utilization 608 exceeds processor threshold 604. Algorithms utilized by application run-time memory optimizer 514 of FIG. 5 factor in the frequency for memory utilization 606 exceeding memory threshold 602 and for processor utilization 608 exceeding processor threshold 604. Because memory utilization 606 does not consistently exceed memory threshold 602, and processor utilization 608 does not consistently exceed processor threshold 604, process 600 is not identified as a candidate for page promotion/page demotion by an application run-time memory optimizer, such as application run-time memory optimizer 514 of FIG. 5.

Referring now specifically to FIG. 6b, a time-line graph plotting resource usage over time of process 620 is shown according to an illustrative embodiment. Memory threshold 622 and processor threshold 624 are thresholds identified within a policy file, such as policy file 512 of FIG. 5. Memory threshold 622 and processor threshold 624 identify a minimum utilization by a process that is necessary for the process to be considered for page promotion. Memory utilization 626 is a graphical representation of memory utilization over a certain time period. Processor utilization 628 is a graphical representation of processor utilization over a certain time period.

For process 620, there are few spikes where memory utilization 626 exceeds memory threshold 622. Processor utilization 628 consistently exceeds processor threshold 624. Algorithms utilized by an application run-time memory optimizer, such as application run-time memory optimizer 514 of FIG. 5, factor in the frequency for memory utilization 626 exceeding memory threshold 622, and for processor utilization 628 exceeding processor threshold 624. Because memory utilization 626 does not consistently exceed memory threshold 622, process 620 is not identified as a candidate for page promotion/page demotion by an application run-time memory optimizer, such as application run-time memory optimizer 514 of FIG. 5.

Referring now specifically to FIG. 6c, a time-line graph plotting resource usage over time of process 640 is shown according to an illustrative embodiment. Memory threshold 642 and processor threshold 644 are thresholds identified within a policy file, such as policy file 512 of FIG. 5. Memory threshold 642 and processor threshold 644 identify a minimum utilization by a process that is necessary for the process to be considered for page promotion. Memory utilization 646 is a graphical representation of memory utilization over a certain time period. Processor utilization 648 is a graphical representation of processor utilization over a certain time period.

For process 640, memory utilization 646 consistently exceeds memory threshold 642, and processor utilization 648 consistently exceeds processor threshold 644. Algorithms utilized by application run-time memory optimizer 514 of FIG. 5 factor in the frequency for memory utilization 646 exceeding memory threshold 642 and for processor utilization 648 exceeding processor threshold 644. Despite the downward spikes of memory utilization 646 and processor utilization 648, process 640 is identified as a candidate for page promotion/page demotion by an application run-time memory optimizer, such as application run-time memory optimizer 514 of FIG. 5.

Figure 7:
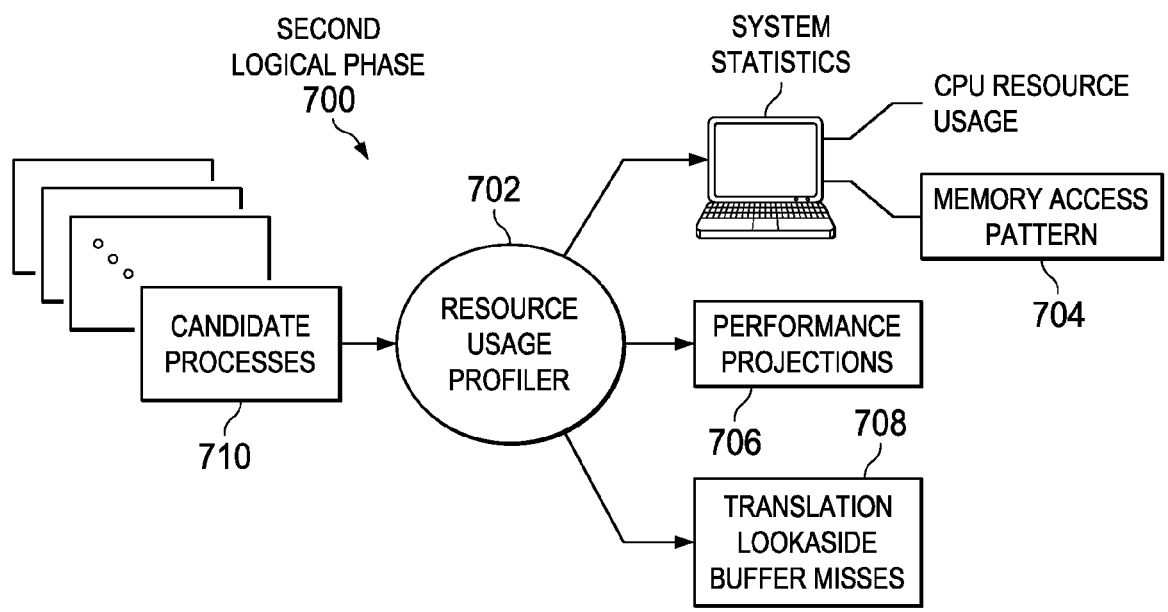
FIG. 7 is a data flow for a second logical phase for promoting or demoting pages to different page sizes according to an illustrative embodiment.

Referring now to FIG. 7, a data flow for a second logical phase for promoting or demoting pages to different page sizes is shown according to an illustrative embodiment. Second logical phase 700 is a subprocess of the dataflow of FIG. 4. In second logical phase 700, resource usage profiler 702, which can be resource usage profiler 418 of FIG. 4, performs run-time profiling to gather system statistics, such as system statistics 422 of FIG. 4. The system statistics can be, for example, but not limited to, processor resource usage, memory access patterns, and page translation misses from the translation lookaside buffer. Gathered information will be consolidated and consumed to decide for page promotion or page demotion.

Candidate processes 710 are candidate processes 516 of FIG. 5. Memory utilization and processor utilization for each of candidate processes 710 have been identified as consistently exceeding both a corresponding memory threshold and a corresponding processor threshold. Thus, each of candidate processes 710 is a process, such as process 640 of FIG. 6.

Resource usage profiler 702 monitors memory access pattern 704. Memory access pattern 704 is a count of the number of page requests that hit and the number of page requests that miss within data caches and instruction caches. When analyzing memory access pattern 704, resource usage profiler 702 monitors for reference consistency over a given time period. Thus, resource usage profiler 702 does not make page promotion or page demotion decisions based on snap-shot statistics, but rather checks the data references over a period of time to ensure that the access trend of memory access pattern 704 is consistent throughout the life-cycle of the monitored application.

Resource usage profiler 702 computes performance projections 706. Performance projections 706 is a statistical modeling for a monitored application's data, heap, stack, or text region utilizing different memory page sizes. That is, performance projections 706 evaluates the number of translation lookaside buffer misses 708 that would have occurred if the monitored application were using a different page size. Performance projections 706 may model the translation lookaside buffer misses 708 that would occur if the application utilized, for example, but not limited to, a 64 kilobyte page size, a 16 megabyte page size, or a 1 gigabyte page size.

For the purpose of making performance projections 706, resource usage profiler 702 considers references to adjacent memory pages as being a reference to the same page. That is, resource usage profiler 702 examines the logical address of the referenced pages from translation lookaside buffer misses 708. Pages that are logically located adjacent to one another are considered to reference a single page of the larger page size. Resource usage profiler 702 can then accurately determine a projected translation lookaside buffer miss rate for each possible promoted page size.

Resource usage profiler 702 utilizes a noncontiguous model for page promotion. The noncontiguous model helps to improve efficiency and promote or demote a larger number of pages. Based on the noncontiguous model, resource usage profiler 702 determines logical address range for the pages that are to be promoted or demoted to a different page size.

Referring now to FIG. 8, a plurality of memory reference patterns to identify promotable pages from candidate pages are shown according to an illustrative embodiment. Memory reference patterns 800, 820, and 840 are logical memory blocks within a paging system used by monitored applications.

Referring now specifically to FIG. 8a, reference pattern 800 indicates page references within a logical memory block. Page references 801-810 are contiguous in nature, while page references 812-816 are also contiguous. Only page 811 is unreferenced, and therefore breaks the contiguousness of page references 801-816. Because page references 801-816 are largely contiguous in nature, reference pattern 800 is considered for page promotion based on contiguous page based algorithms.

Referring now to FIG. 8b, reference pattern 820 indicates page references within the logical memory block. Page references 821-836 are largely non-contiguous in nature. However, while there are several breaks in the contiguousness of page references 821-836, the total number of pages referenced remains large compared to the size of the promoted page. Because the total number of referenced pages of page references 821-836 is large compared to the size promoted page size, reference pattern 820 is considered for page promotion based on reference count based algorithms.

Referring now to FIG. 8c, reference pattern 840 indicates page references within the logical memory block. Page references 841-856 are largely non-contiguous in nature. Furthermore, the total number of pages referenced for page references 841-856 is small when compared to the size of the promoted page. However, reference pattern 840 may still be a candidate for page promotion if the data references for page reference 841, page reference 848, and page reference 855 is high, and performance projections, such as performance projections 706 of FIG. 7, predict a reduction of translation lookaside buffer misses.

Figure 9:
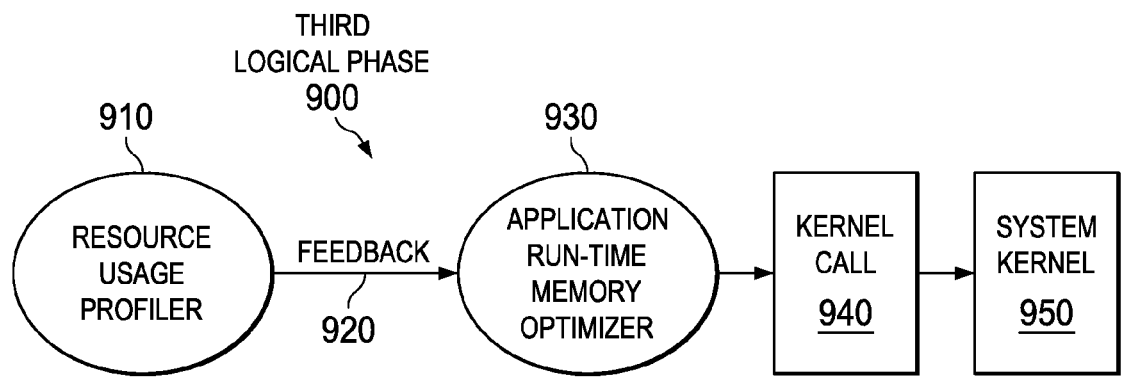
FIG. 9 is a data flow for a third logical phase for promoting or demoting pages to different page sizes according to an illustrative embodiment.

Referring now to FIG. 9, a data flow for a third logical phase for promoting or demoting pages to different page sizes is shown according to an illustrative embodiment. Third logical phase 900 is a subprocess of the dataflow of FIG. 4.

Resource usage profiler 910 is resource usage profiler 418 of FIG. 4. Resource usage profiler 910 provides feedback 920 to application run-time memory optimizer 930. Application run-time memory optimizer 930 is application run-time memory optimizer 414 of FIG. 4. Application run-time memory optimizer 930 then utilizes a kernel interface to make kernel call 940 to system kernel 950. System kernel 950 then performs page promotion or page demotion for the address range identified in by feedback 920.

Figure 10:
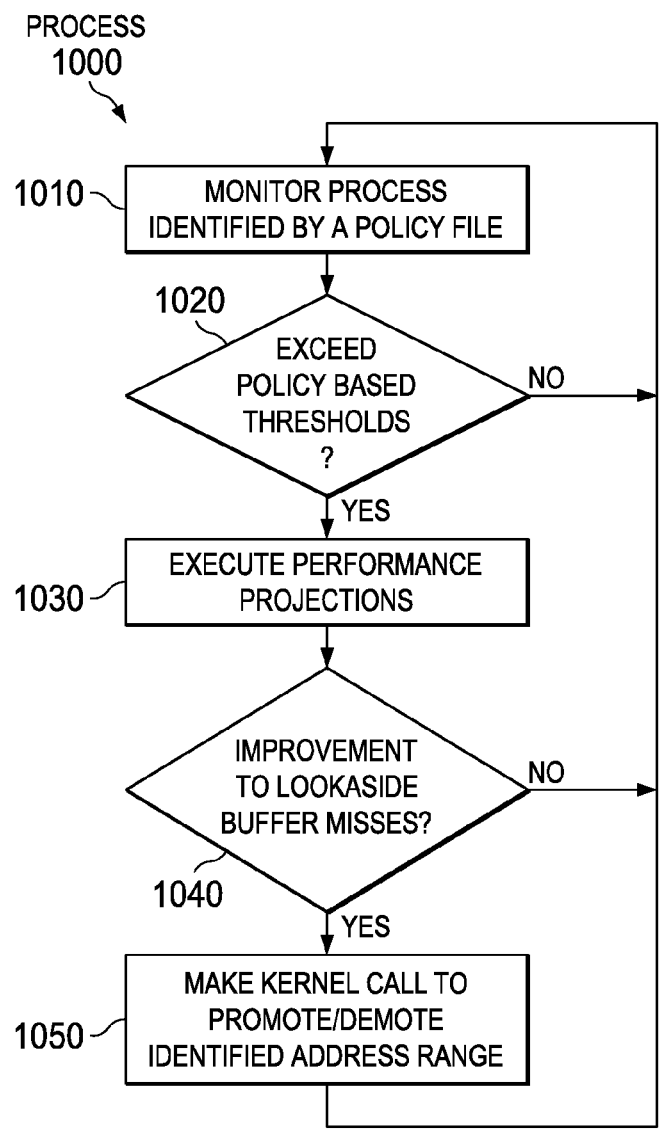
FIG. 10 is a flowchart of a process for promoting or demoting pages to different page sizes according to an illustrative embodiment.

Referring now to FIG. 10, a flowchart of a process for promoting or demoting pages to different page sizes is shown according to an illustrative embodiment. Process 1000 is a software process, executing on software components, such as application run-time memory optimizer 414 and resource usage profiler 418 of FIG. 4.

Process 1000 begins by monitoring processes identified by a policy file (step 1010). The policy file is policy file 412 of FIG. 4. The memory utilization and processor utilization of the monitored processes are constantly compared to the processor threshold and memory threshold, respectively. The memory threshold can be memory threshold 602, 622, or 642 of FIG. 6. The processor threshold can be processor threshold 604, 624, or 644 of FIG. 6. The memory utilization can be memory utilization 606, 626, or 646 of FIG. 6. The processor utilization can be processor utilization 608, 628, or 648 of FIG. 6.

Process 1000 seeks to identify whether both the memory utilization and the processor utilization consistently exceed the memory threshold and the processor threshold, respectively, such as with process 640 of FIG. 6. Thus, process 1000 determines whether the monitored process exceeds the policy based thresholds (step 1020)? Responsive to the monitored process not exceeding the policy based thresholds ("no" at step 1020), process 1000 iterates back to step 1010 and continues to monitor the identified processes.

Returning now to step 1020, responsive to the monitored process exceeding the policy based thresholds ("yes" at step 1020), process 1000 then executes performance projections for the identified processes (step 1030). The performance projections are determined as shown in FIG. 7. A resource usage profiler, such as resource usage profiler 702 of FIG. 7, evaluates the number of translation lookaside buffer misses that would have occurred if the monitored application were using a different page size.

Responsive to executing performance projections for the identified processes, process 1000 determines whether the monitored application would experience an improvement in the number of translation lookaside buffer misses for a different projected page size (step 1040). Responsive to determining that the monitored application would not experience an improvement in the number of translation lookaside buffer misses for a different projected page size ("no" at step 1040), process 1000 iterates back to step 1010 and continues to monitor the identified processes.

Returning now to step 1040, responsive to determining that the monitored application would experience an improvement in the number of translation lookaside buffer misses for a different projected page size ("yes" at step 1040), process 1000 makes a kernel call to the system kernel to promote/demote the identified address range to the larger page size (step 1050). Process 1000 iterates back to step 1010 and continues to monitor the identified processes.

Thus, the illustrative embodiments provide an application run-time memory optimizer to dynamically alter the page size used by the application. The run-time memory optimizer promotes pages from smaller to larger page sizes and demotes pages from larger to smaller page sizes. The run-time memory optimizer can be constantly active and can continuously monitor and optimize applications based on the applications' demand on the central processing unit and the available memory resources. The promotion and demotion of pages within the running application to different page sizes is done on the basis of central processing unit resources, memory access patterns, and page translation misses.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for optimizing memory page sizes during runtime, the computer implemented method comprising:
    identifying a process from a policy file, the policy file containing at least one policy based threshold for a set of stated desired policies;
    monitoring the process during runtime;
    determining whether the process exceeds the set of stated desired policies from the set of policy based thresholds;
    responsive to determining whether the process exceeds the set of stated desired policies from the set of policy based thresholds, executing a performance projection for the process, wherein the computer implemented step of executing the performance projection for the process further comprises: examining a plurality of logical addresses for a plurality of referenced pages from a plurality of translation lookaside buffer misses; identifying pages of the plurality of referenced pages that are logically located adjacent to one another for consideration as a larger page size; and determining a number of translation lookaside buffer misses that would have occurred using the larger page size;
    determining from the performance projection whether the process would experience a performance benefit from a different page size; and
    responsive to determining that the process would experience the performance benefit from the different page size, changing a page size for the process.

2. The computer implemented method of claim 1, wherein the computer implemented step of monitoring the process during runtime further comprises:
    gathering system statistics by a resource usage profile, wherein the system statistics are selected from a group consisting of central processing unit resource usage, memory access patterns, page translation misses from a translation lookaside buffer, cache misses from data and instruction caches, and combinations thereof.

3. The computer implemented method of claim 2, wherein the computer implemented step of determining whether the process exceeds the set of stated desired policies from the set of policy based thresholds, comprises:
    determining whether the cache misses from data and instruction caches exceeds a cache miss threshold of the at least one policy based threshold.

4. The computer implemented method of claim 1, wherein the computer implemented step of determining from the performance projection whether the process would experience the performance benefit from the different page size further comprises:
    determining whether the number of translation lookaside buffer misses that would have occurred using the larger page size is less than the plurality of translation lookaside buffer misses for an original page size.

5. The computer implemented method of claim 1, wherein the computer implemented step of changing the page size for the process further comprises:
    making a kernel call to a system kernel; and
    performing page promotion or demotion for the process within the system kernel.

6. The computer implemented method of claim 1, wherein the computer implemented step of determining whether the process exceeds the set of stated desired policies from the set of policy based thresholds, further comprises:
    determining whether the process exceeds a processor usage policy based threshold; and
    determining whether the process exceeds a memory usage policy based threshold.

7. A non-transitory computer readable storage medium having computer usable instructions encoded thereon for optimizing memory page sizes during runtime, the computer readable storage medium comprising:
    first instructions for identifying a process from a policy file, the policy file containing at least one policy based threshold for a set of stated desired policies;
    second instructions for monitoring the process during runtime;
    third instructions for determining whether the process exceeds the set of stated desired policies from the set of policy based thresholds;
    fourth instructions, responsive to determining whether the process exceeds the set of stated desired policies from the set of policy based thresholds, for executing a performance projection for the process, wherein the fourth instructions for executing the performance projection for the process further comprises: instructions for examining a plurality of logical addresses for a plurality of referenced pages from a plurality of translation lookaside buffer misses; instructions for identifying pages of the plurality of referenced pages that are logically located adjacent to one another for consideration as a larger page size; and instructions for determining a number of translation lookaside buffer misses that would have occurred using the larger page size;
    fifth instructions for determining from the performance projection whether the process would experience a performance benefit from a different page size; and
    sixth instructions, responsive to determining that the process would experience the performance benefit from the different page size, for changing a page size for the process.

8. The non-transitory computer readable storage medium of claim 7, wherein the second instructions for monitoring the process during runtime further comprises:
    instructions for gathering system statistics by a resource usage profile, wherein the system statistics are selected from a group consisting of central processing unit resource usage, memory access patterns, page translation misses from a translation lookaside buffer, cache misses from data and instruction caches, and combinations thereof.

9. The non-transitory computer readable storage medium of claim 8, wherein the third instructions for determining whether the process exceeds the set of stated desired policies from the set of policy based thresholds, comprises:

determining whether the cache misses from data and instruction caches exceeds a cache miss threshold of the at least one policy based threshold.

10. The non-transitory computer readable storage medium of claim 7, wherein the fifth instructions for determining from the performance projection whether the process would experience the performance benefit from the different page size further comprises:
instructions for determining whether the number of translation lookaside buffer misses that would have occurred using the larger page size is less than the plurality of translation lookaside buffer misses for an original page size.

11. The non-transitory computer readable storage medium of claim 7, wherein the sixth instructions for changing the page size for the process further comprises:
instructions for making a kernel call to a system kernel; and
instructions for performing page promotion or demotion for the process within the system kernel.

12. The non-transitory computer readable storage medium of claim 7, wherein the fourth instructions for determining whether the process exceeds the set of stated desired policies from the set of policy based thresholds, further comprises:
instructions for determining whether the process exceeds a processor usage policy based threshold; and
determining whether the process exceeds a memory usage policy based threshold.

13. A data processing system comprising:
a storage having computer usable instructions encoded thereon for optimizing memory page sizes during runtime;
a bus system connecting the storage to a processor; and
a processor, wherein the processor executes the computer usable instructions:
to identify a process from a policy file, the policy file containing at least one policy based threshold for a set of stated desired policies;
to monitor the process during runtime; to determine whether the process exceeds the set of stated desired policies from the at least one policy based threshold;
responsive to determining whether the process exceeds the set of stated desired policies from the at least one policy based threshold, to execute a performance projection for the process, wherein executing the performance projection for the process further comprises the processor executing the computer usable instructions: to examine a plurality of logical addresses for a plurality of referenced pages from a plurality of translation lookaside buffer misses; to identify pages of the plurality of referenced pages that are logically located adjacent to one another for consideration as a larger page size; and to determine a number of translation lookaside buffer misses that would have occurred using the larger page size;
to determine from the performance projection whether the process would experience a performance benefit from a different page size; and
responsive to determining that the process would experience the performance benefit from the different page size, to change a page size for the process.

14. The data processing system of claim 13, wherein the processor executing the computer usable instructions to monitor the process during runtime further comprises the processor executing the computer usable instructions:
to gather system statistics by a resource usage profile, wherein the system statistics are selected from a group consisting of central processing unit resource usage, memory access patterns, page translation misses from a translation lookaside buffer, cache misses from data and instruction caches, and combinations thereof.

15. The data processing system of claim 14, wherein the processor executing the computer usable instructions to determine whether the process exceeds the set of stated desired policies from the at least one policy based threshold, comprises the processor executing the computer usable instructions:
to determine whether the cache misses from data and instruction caches exceeds a cache miss threshold of the at least one policy based threshold.

16. The data processing system of claim 13, wherein the processor executing the computer usable instructions to determine from the performance projection whether the process would experience the performance benefit from the different page size further comprises the processor executing the computer usable instructions:
to determine whether the number of translation lookaside buffer misses that would have occurred using the larger page size is less than the plurality of translation lookaside buffer misses for an original page size.

17. The data processing system of claim 13, wherein the processor executing the computer usable instructions to change the page size for the process further comprises the processor executing the computer usable instructions:
to make a kernel call to a system kernel; and
to perform page promotion or demotion for the process within the system kernel.

18. The data processing system of claim 13, wherein the processor executing the computer usable instructions to determine whether the process exceeds the set of stated desired policies from the at least one policy based threshold, further comprises the processor executing the computer usable instructions:
to determine whether the process exceeds a processor usage policy based threshold; and
to determine whether the process exceeds a memory usage policy based threshold.

* * * * *